US012773914B2

(12) United States Patent
Favaretto

(10) Patent No.: US 12,773,914 B2
(45) Date of Patent: Oct. 27, 2026

(54) BATTERY ASSEMBLY FOR A MOTOR VEHICLE AND MOTOR VEHICLE COMPRISING THE SAME

(71) Applicant: FERRARI S.P.A., Modena (IT)

(72) Inventor: Fabrizio Favaretto, Modena (IT)

(73) Assignee: FERRARI S.P.A. (IT)

(*) Notice: Subject to any disclaimer, the term of this patent is extended or adjusted under 35 U.S.C. 154(b) by 286 days.

(21) Appl. No.: 18/610,371

(22) Filed: Mar. 20, 2024

(65) Prior Publication Data

US 2024/0317076 A1 Sep. 26, 2024

(30) Foreign Application Priority Data

Mar. 21, 2023 (IT) ........................ 102023000005277

(51) Int. Cl.
*B60L 50/64* (2019.01)
*B60L 58/26* (2019.01)
*H01M 10/613* (2014.01)

(52) U.S. Cl.
CPC ............... *B60L 50/64* (2019.02); *B60L 58/26* (2019.02); *H01M 10/613* (2015.04); *H01M 2220/20* (2013.01)

(58) Field of Classification Search
CPC ...... B60L 50/64; B60L 58/26; H01M 10/613; H01M 10/52; H01M 10/625; H01M 50/204; H01M 50/24; H01M 50/244; H01M 50/249; H01M 50/271; H01M 2220/20
See application file for complete search history.

(56) References Cited

U.S. PATENT DOCUMENTS

2015/0037616 A1 2/2015 Wyatt et al.
2015/0037649 A1 2/2015 Wyatt et al.
2015/0372355 A1 12/2015 Mclaughlin et al.
2017/0225588 A1 8/2017 Newman
2017/0279169 A1 9/2017 Obrist et al.
2021/0178902 A1 6/2021 Liu et al.
2021/0195808 A1 6/2021 Liu et al.
2021/0384577 A1 12/2021 Wyatt et al.

FOREIGN PATENT DOCUMENTS

EP 3961779 A1 3/2022
WO WO-2012076808 A1 * 6/2012 .............. B60L 50/64

OTHER PUBLICATIONS

WO 2012/076808 A1 translation (Year: 2012).*
Search Report issued in Italian Patent Application No. 102023000005277.

* cited by examiner

*Primary Examiner* — Timothy Hannon
(74) *Attorney, Agent, or Firm* — The Belles Group, P.C.

(57) ABSTRACT

A battery assembly for a motor vehicle comprising a case defining an inner volume, which is fluidly isolated from outside atmospheric air, a plurality of batteries arranged within the inner volume; a passive dehydrating device and an exchange volume housing said dehydrating device. The exchange volume can selectively be shifted, relative to the case, to a first position, in which the exchange volume is fluidly connected to said the volume and fluidly isolated from outside atmospheric air, or to a second position, in which the exchange volume is fluidly isolated from the inner volume and fluidly connected to outside atmospheric air.

8 Claims, 7 Drawing Sheets

BATTERY ASSEMBLY FOR A MOTOR VEHICLE AND MOTOR VEHICLE COMPRISING THE SAME

CROSS-REFERENCE TO RELATED APPLICATIONS

This patent application claims priority from Italian patent application no. 102023000005277 filed on Mar. 21, 2023, the entire disclosure of which is incorporated herein by reference.

TECHNICAL FIELD

The invention relates to a battery assembly for a motor vehicle and to a motor vehicle comprising a battery assembly.

BACKGROUND

As it is known electric or hybrid motor vehicles basically comprise: a frame; a plurality of wheels, which can rotate relative to the frame around respective rotational axes and are adapted to move the frame relative to the ground on which they rest; one or more electric motor means adapted to cause the wheels to rotate around the respective axes; and one or more batteries electrically connected to the electric motors and accommodated inside a suitable container.

Furthermore, motor vehicles are known, which comprise systems for the adjustment of the temperature of the batteries. As a matter of fact, batteries operating at temperatures close to or below ambient temperature are characterised by a greater efficiency compared to batteries operating at higher temperatures. This allows manufacturers to reduce the portion of vehicle weight used to store power.

However, the humidity of the air naturally present in the container of the batteries tends to condense as the temperature of the batteries decreases. In particular, the inner walls of the container act as condensing plates for said humidity, which, once liquefied, tends to gather at the bottom of the container.

Since the overall dimensions of the container of the batteries in electric or hybrid vehicles can be very large, the quantity of condensate forming in the container risks determining short circuits.

Owing to the above, known motor vehicles need to be improved in order to limit the risk of short circuits due to the condensate forming in the containers of the batteries.

The object of the invention is to fulfil the need discussed above, preferably in a simple and reliable fashion.

SUMMARY OF THE INVENTION

The above objects may be reached by the present invention. In one aspect, the invention can be a battery assembly for a motor vehicle, comprising: a case defining an inner volume; said inner volume being fluidly isolated from outside atmospheric air; a plurality of batteries arranged within said inner volume; at least one passive dehydrating device; an exchange volume housing said dehydrating device; wherein said exchange volume is selectively positionable relative to said case in: a first position, wherein said exchange volume is fluidly connected to said inner volume and fluidly isolated from outside atmospheric air; or a second position, wherein said exchange volume is fluidly isolated from said inner volume and fluidly connected to outside atmospheric air.

In another aspect, the invention can be a motor vehicle comprising: a frame; a plurality of wheels rotatable about respective rotational axes relative to said frame; electrical motor means operatively connected to said wheels and adapted to drive said wheels in rotation about said rotational axes; a battery assembly comprising: a case defining an inner volume; said inner volume being fluidly isolated from outside atmospheric air; a plurality of batteries arranged within said inner volume; at least one passive dehydrating device; an exchange volume housing said dehydrating device; wherein said exchange volume is selectively positionable relative to said case in: a first position, wherein said exchange volume is fluidly connected to said inner volume and fluidly isolated from outside atmospheric air; or a second position, wherein said exchange volume is fluidly isolated from said inner volume and fluidly connected to outside atmospheric air; and said plurality of batteries of said battery assembly being electrically connected to said electrical motor means.

BRIEF DESCRIPTION OF THE DRAWINGS

Hereinafter, an embodiment of the invention will be described, in order to allow the latter to be better understood, by way of non-limiting example and with reference to the accompanying drawings, wherein.

DETAILED DESCRIPTION

Figure 1:
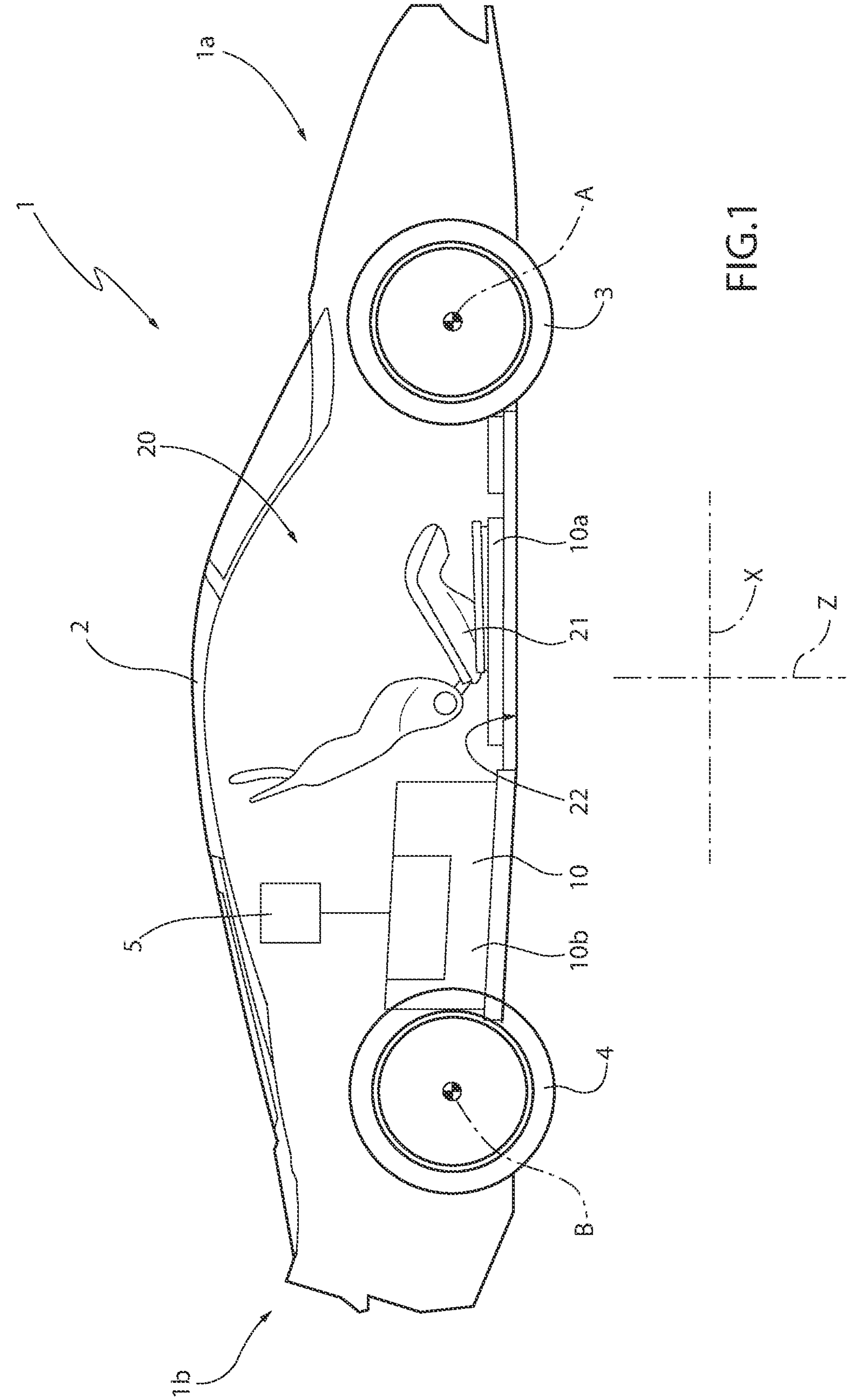
FIG. 1 is a schematic side view of a motor vehicle comprising a battery assembly according to the invention and with parts removed for greater clarity.

In FIG. 1, reference number 1 is used to indicate, as a whole, an electric or hybrid motor vehicle comprising: a frame 2; a plurality of wheels 3, 4, which can rotate around respective rotational axes A, B relative to frame 2; one or more electric motors 5—only schematically shown—adapted to cause the wheels 3, 4 to rotate about the respective axes A, B; and a battery assembly 10.

The vehicle 1 defines a front portion 1*a* and a rear portion 1*b* opposite one another along a longitudinal direction X of the vehicle. Therefore, there are a pair of front wheels 3 arranged at front portion 1*a* and a pair of rear wheels 4 arranged at rear portion 1*b*.

The vehicle 1 could comprise an internal combustion engine and/or fuel cells. In addition, the vehicle 1 preferably is a sports car.

The frame 2 defines, in turn, a passenger compartment 20 adapted to accommodate the driver and possible passengers and comprising one or more seats 21. In the specific case shown herein, the vehicle 1 comprises one single pair of seats 21 (FIG. 1).

The frame 2 also comprises a floorboard 22, which constitutes the portion of the frame 2 closest to the ground along a direction Z, which is orthogonal to the longitudinal direction X and to the ground on which the wheels 3, 4 rest (FIG. 1).

The battery assembly 10 comprises, in turn, a case 11 defining an inner volume 12*a*, 12*b*, which is fluidly isolated from outside atmospheric air, and a plurality of batteries 13 accommodated in the inner volume 12*a*, 12*b*.

"Outside atmospheric air" means air present on the outside of the inner volume 12*a*, 12*b*. In particular, said outside atmospheric air could be inside the motor vehicle 1 or it could directly come from the outside of the motor vehicle 1.

In the specific case shown herein, the battery assembly 10 comprises a front group 10*a* and a rear group 10*b* opposite one another along the longitudinal direction X. In detail, the extension of the front group 10*a* along the direction Z is smaller than the extension of the rear group 10*b* along the direction Z (FIG. 2).

The battery assembly 10 is interposed between the front wheels 3 and the rear wheels 4 along the longitudinal direction X. More in detail, the front group 10*a* is located immediately under the seats 21 along the direction Z and the rear group 10*b* is located behind the seats 21 along the longitudinal direction X (FIG. 1).

Figure 2:
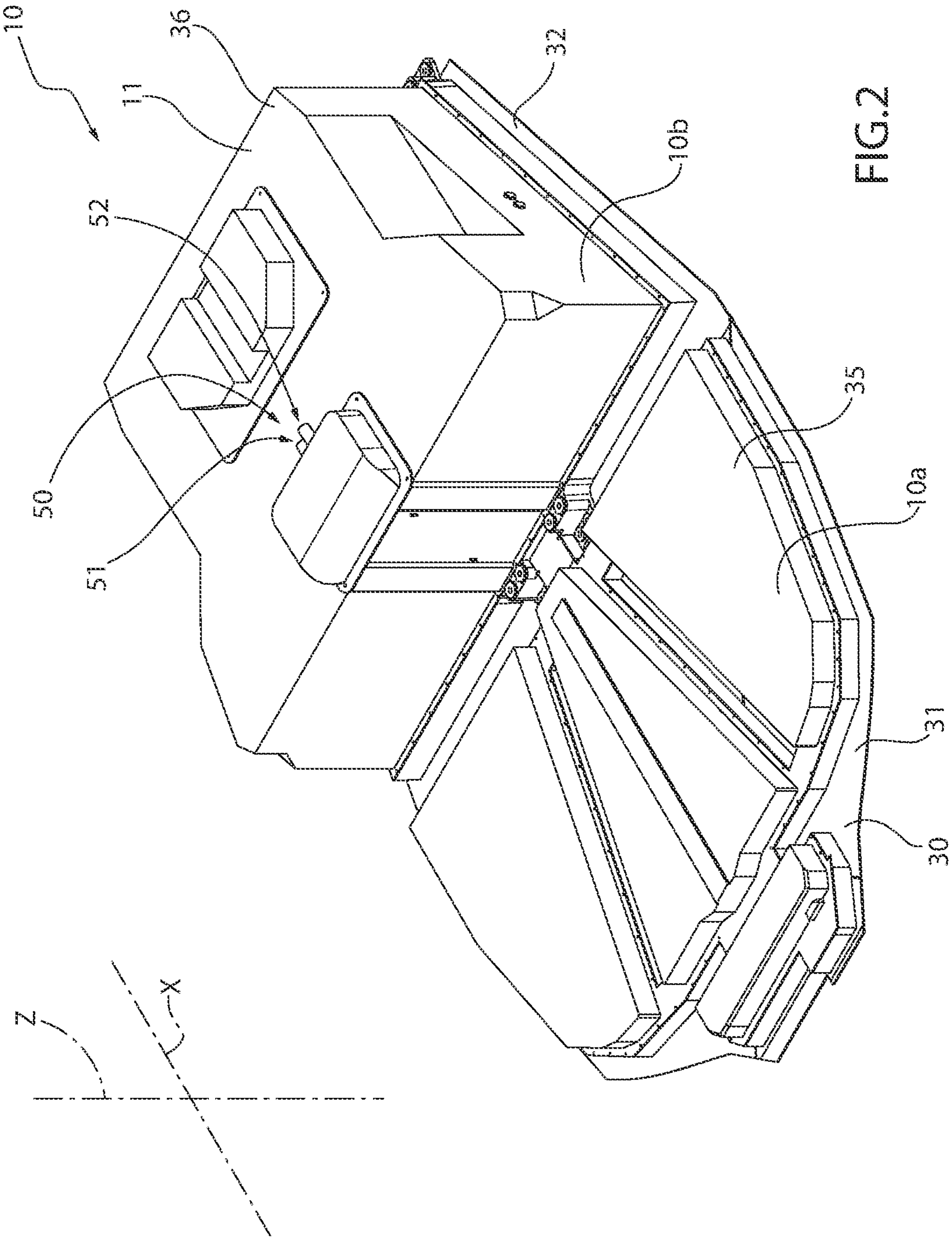
FIG. 2 is a perspective view of the battery assembly of FIG. 1.
Figure 3:
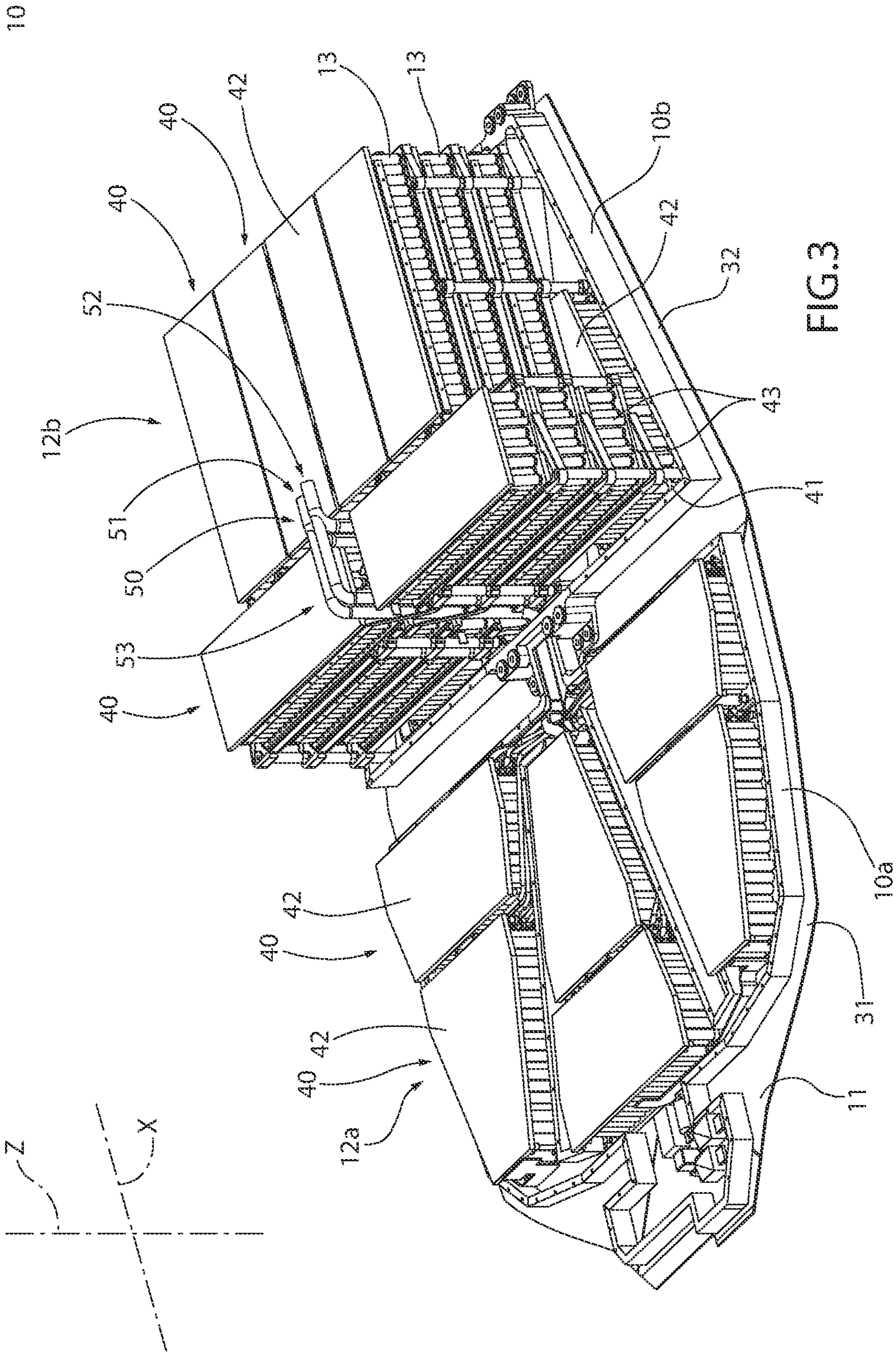
FIG. 3 is a perspective view of the battery assembly of FIG. 1 or 2 with parts removed for greater clarity.

As shown in FIGS. 2 and 3, the front and rear groups 10*a*, 10*b* are mechanically connected to one another. Specifically, the case 11 comprises: a base body 30, to which the front and rear groups 10*a*, 10*b* are fixed or integrated and which is fixed to the floorboard 22; a lid 35, which is coupled to the base body 30 and covers the batteries 13 of the front group 10*a*; and a lid 36, which is coupled to the base body 30 and covers the batteries 13 of the rear group 10*b*.

The inner volume 12*a* is the volume enclosed by the base body 30 and by the lid 35 and the inner volume 12*b* is the volume enclosed by the base body 30 and by the lid 36. In the specific case shown herein, the inner volumes 12*a* and 12*b* are fluidly isolated from one another.

The base body 30 comprises, in turn: a plate 31 at the front group 10*a*; and a plate 32 at the rear group 10*b*, which is joined to or integrated in the plate 31 (FIG. 2).

The front and rear groups 10*a*, 10*b* are arranged at an angle relative to one another (FIG. 1). In detail, the plate 31 is parallel or substantially parallel to the ground and the plate 32 is inclined relative to the plate 31. More in detail, moving along the longitudinal direction X from the front portion 1*a* to the rear portion 1*b*, the distance between the rear group 10*b* and the ground along the direction Z increases in a progressive manner. The rear group 10*b* is inclined at an angle smaller than 10°—preferably ranging from 3° to 5°—relative to the front group 10*a*.

As shown in FIG. 3, the front group 10*a* and the rear group 10*b* each comprise a plurality of batteries 13 next to one another and grouped in modules 40. The batteries 13 preferably are alike and have a cylindrical shape.

Each module 40 comprises a base plate 41 and a plate 42 opposite the plate 41 along the direction Z, the batteries 13 belonging to the module being interposed between them. Furthermore, the batteries 13 of each module 40 are parallel to or substantially parallel to the direction Z. Each module 40 can further comprise a plurality of columns 43, which are also interposed between the plate 41 and the relative plate 42. The assembly formed by the plates 41, 42 and by the columns 43—if present—is adapted to support the batteries 13 and hold them firmly relative to one another.

In the specific case shown herein, the plates 41, 42 of the modules 40 of the front group 10*a* have trapezoid-like or substantially trapezoid-like shapes; the plates 41, 42 of the modules 40 of the rear group 10*b* are rectangular and are equal to one another.

The front group 10*a* comprises one single layer of modules 40 coplanar to one another and fixed to the plate 31. The rear group 10*b* comprises a plurality of layers of modules 40 stacked on top of one another parallel to the direction Z. In particular, in the rear group 10*b*, the plate 42 of each module 40 serves as base plate 41 of the respective module 40 arranged immediately on top of it along the direction Z.

The arrangement of the batteries 13 in the battery assembly 10 preferably is symmetrical relative to a middle plane parallel to the directions X and Z.

The battery assembly 10 can further comprise one or more power electronics devices (for example, inverters, choppers, switching devices) accommodated at the inner volume 12*a*, 12*b*.

The vehicle 1 also comprises a cooling system 50 (only partly shown in FIG. 2) adapted to limit the temperature of the batteries 13. The temperature of the batteries 13 is the temperature measured at the outer surface of the batteries, close to it, or at the inner volume 12*a*, 12*b* in general.

The cooling system 50 comprises a circuit, where a cooling fluid flows, and a cooling fluid circulating pump, which is known per se and not shown herein.

The circuit comprises, in turn: an inlet opening 51 adapted to allow the cooling fluid to flow into the inner volume 12*a*, 12*b*; an outlet opening 52 adapted to allow the cooling fluid to flow out of the inner volume 12*a*, 12*b*; a fluid path 53, which is fluidly interposed between the inlet opening 51 and the outlet opening 52 and extends inside the battery assembly 10.

The fluid path 53 comprises at least some of the plates 41 and 42, which are hollow and are adapted to be flown through by the cooling fluid, and a plurality of ducts, which establish a fluid communication between the openings 51, 52 and the plates 41, 42 and between the plates 41, 42.

Figure 4:
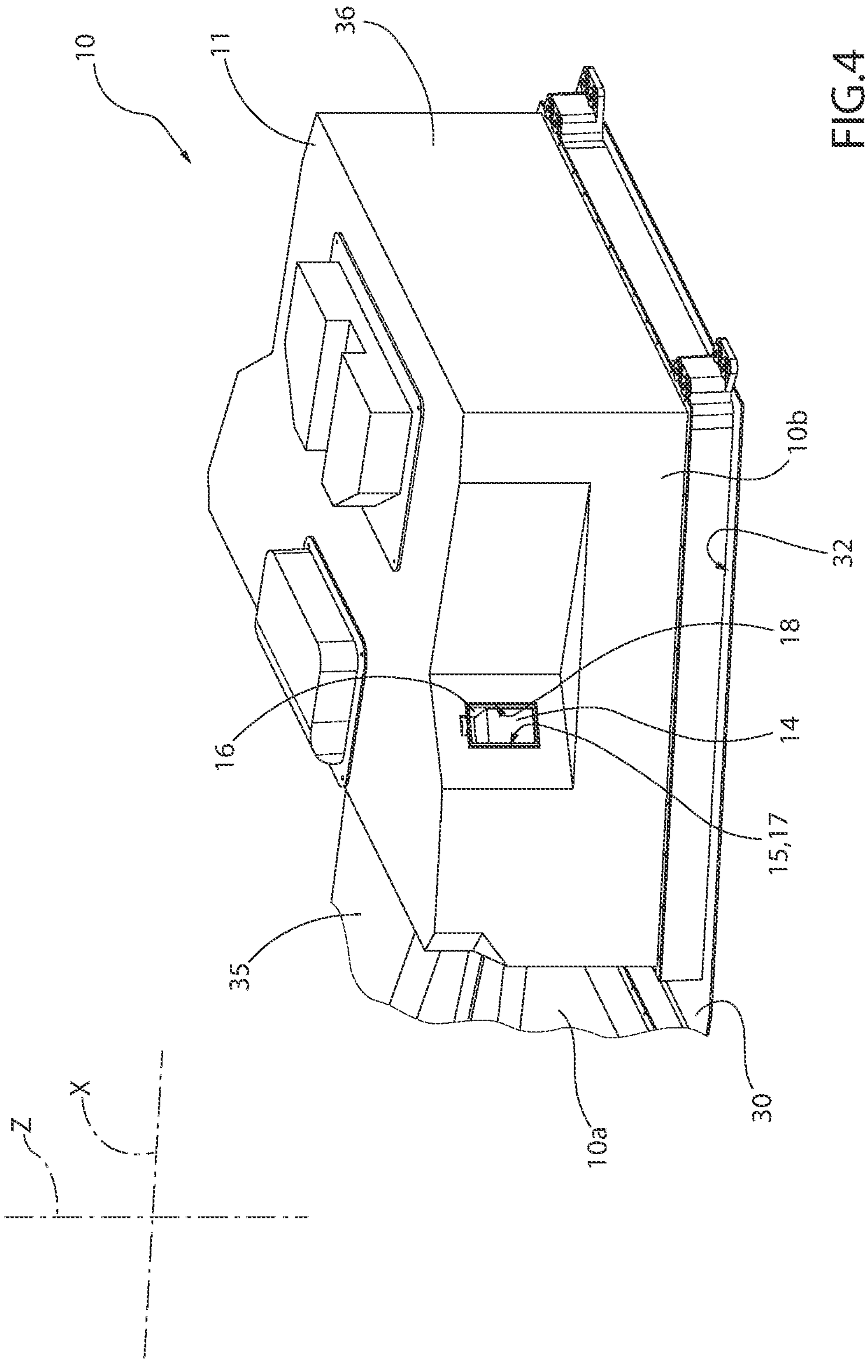
FIGS. 4 and 5 show the battery assembly in respective operating positions.
Figure 8:
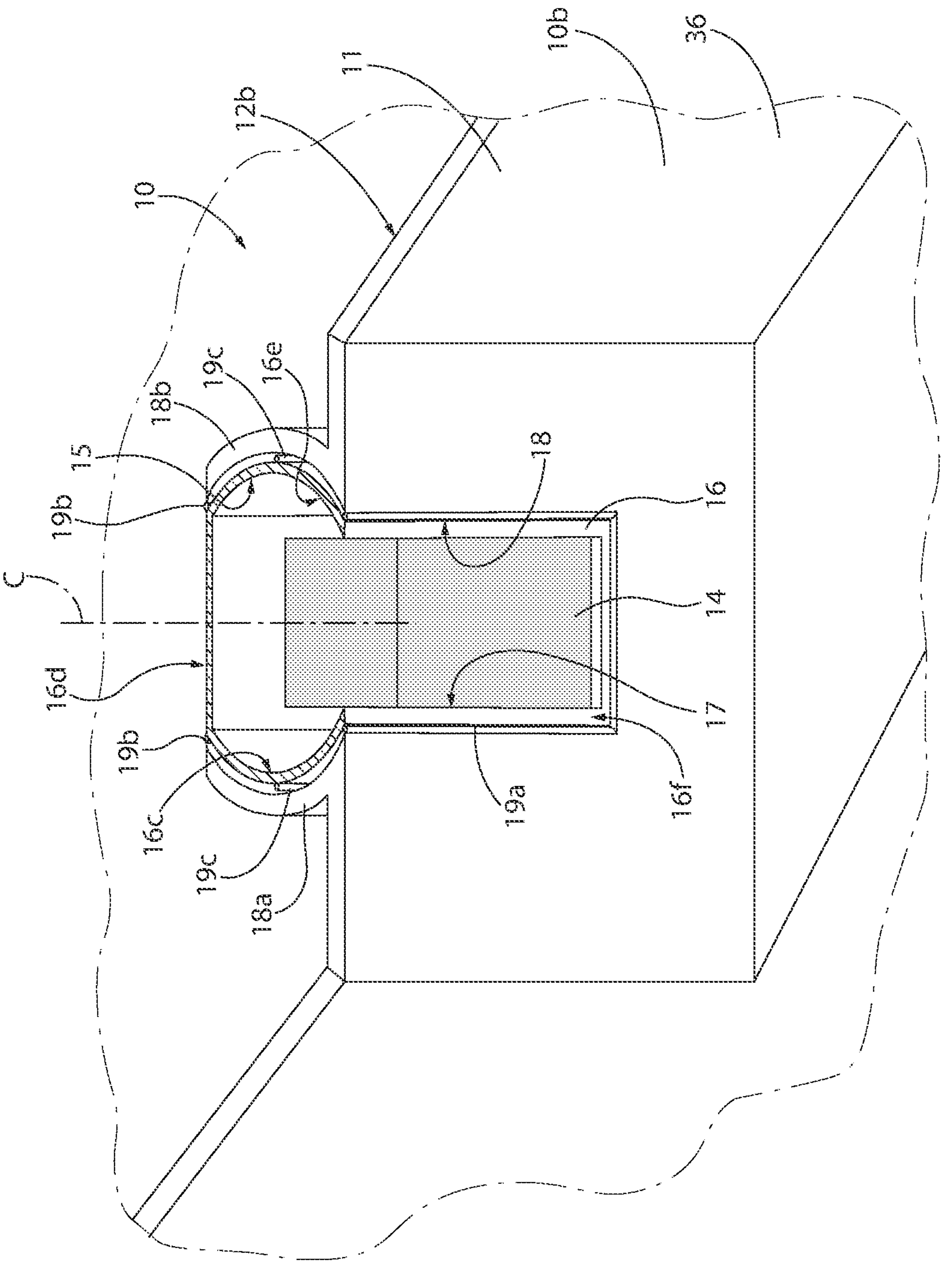
FIG. 8 is a perspective sectional view of the battery assembly of FIG. 4 with parts removed for greater clarity and on a much larger scale.

The battery assembly 10 advantageously comprises a passive dehydrating device 14 and an exchange volume 15, which accommodates the dehydrating device 14 and is selectively positionable in: a first position, in which the exchange volume 15 is fluidly connected to the inner volume 12*b* and fluidly isolated from outside atmospheric air (FIG. 5); or a second position, in which the exchange volume 15 is fluidly isolated from the inner volume 12*b* and fluidly connected to outside atmospheric air (FIGS. 4 and 8).

Even though, in the embodiment shown herein, the battery assembly 10 comprises one single dehydrating device 14 adapted to dehumidify the inner volume 12*b*, the battery assembly 10 could comprise-alternatively or in addition-a dehydrating device 14 adapted to dehumidify the inner volume 12*a*. For the sake of brevity, hereinafter reference will be made to one single dehydrating device 14, since all considerations made for one of them also apply to the other ones.

A passive dehydrating device is a device capable of absorbing humidity from the air contained in the inner volume 12*a*, 12*b* due to the difference in concentration of humidity between the respective inner volume 12*a*, 12*b* and the dehydrating device 14. The operation of the dehydrating device 14 is based on the law of diffusion of humidity from the inner volume 12*a*, 12*b* to the dehydrating device 14. Therefore, the dehydrating device 14 is adapted to reduce the concentration of humidity in the relative inner volume 12*a*, 12*b* without requiring the supply of further energy.

Specifically, the dehydrating device 14 comprises a hygroscopic salt cartridge.

As shown in FIGS. 4 to 8, the battery assembly 10 comprises a container 16, which defines the exchange volume 15 and comprises an opening 17.

Figure 5:
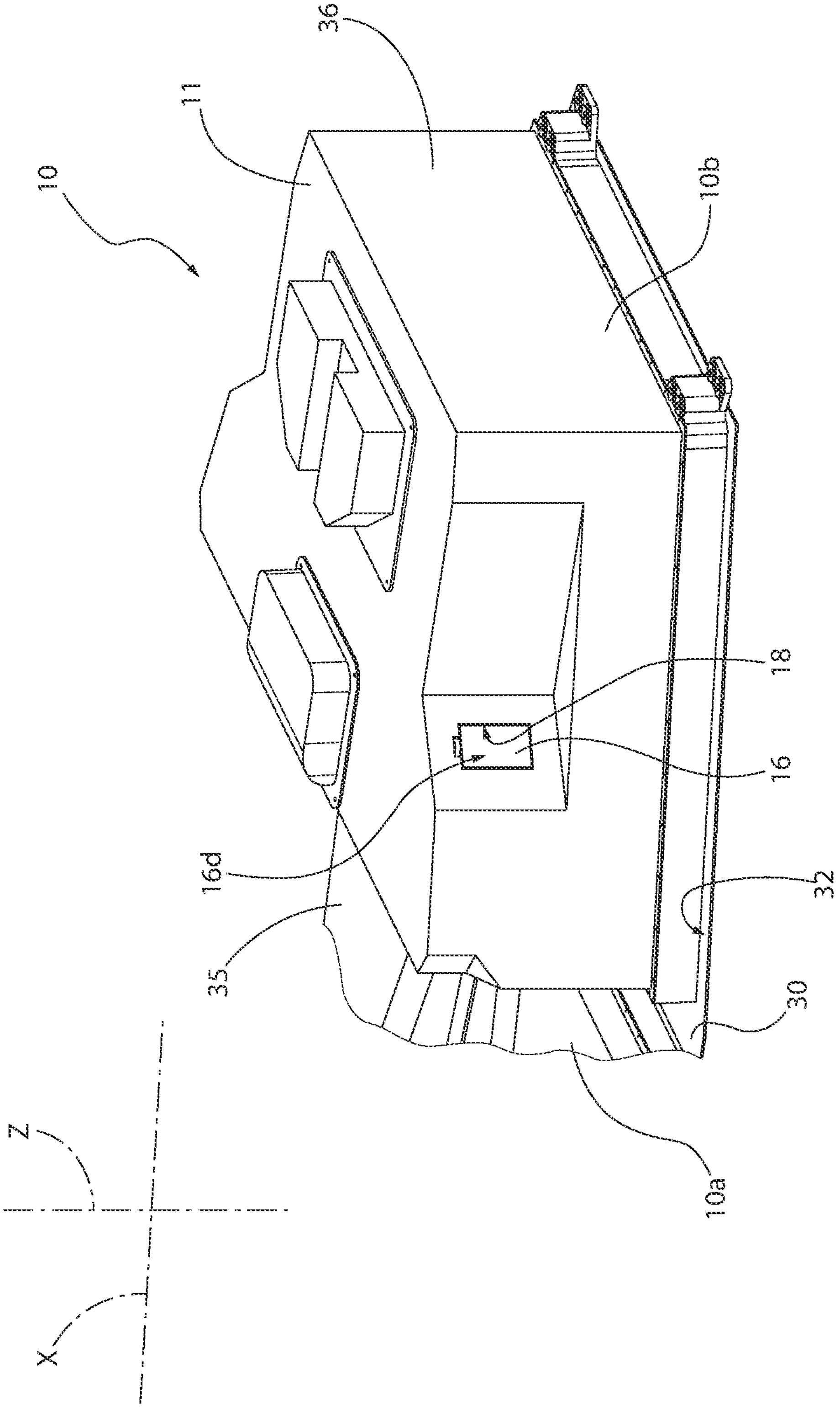

In detail, when the exchange volume 15 is in the first position, the opening 17 faces the inner volume 12*b* and establishes a fluid communication between the exchange volume 15 and the inner volume 12*b* (FIG. 5). In this condition, the dehydrating device 14 is adapted to absorb humidity from the air contained in the inner volume 12*b*.

When the exchange volume 15 is in the second position, the opening 17 is fluidly isolated from the inner volume 12*b* and is accessible from the outside of the battery assembly 10 (FIGS. 4 and 8). In this condition, the dehydrating device 14 is accessible from the outside of the battery assembly 10 and can be replaced during maintenance operations.

Figure 7:
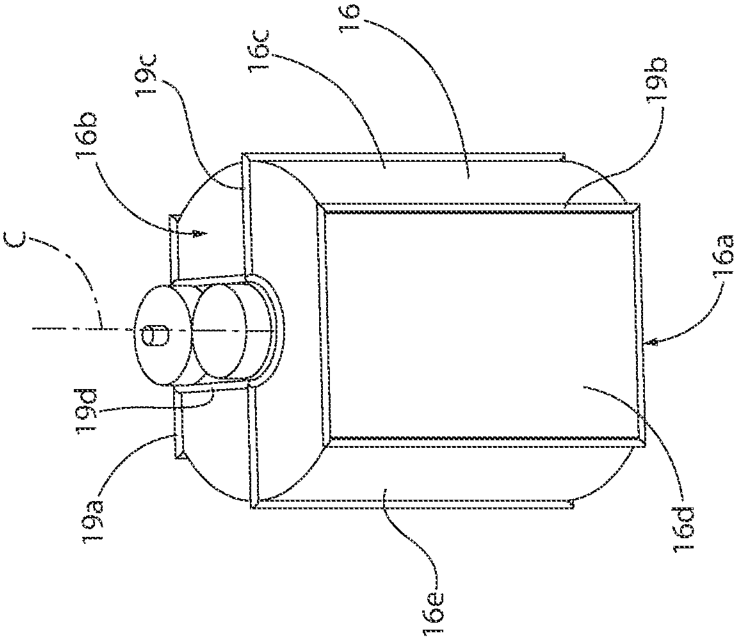
FIGS. 6 and 7 are perspective views of a component of the battery assembly of FIGS. 1 to 5.
Figure 6:
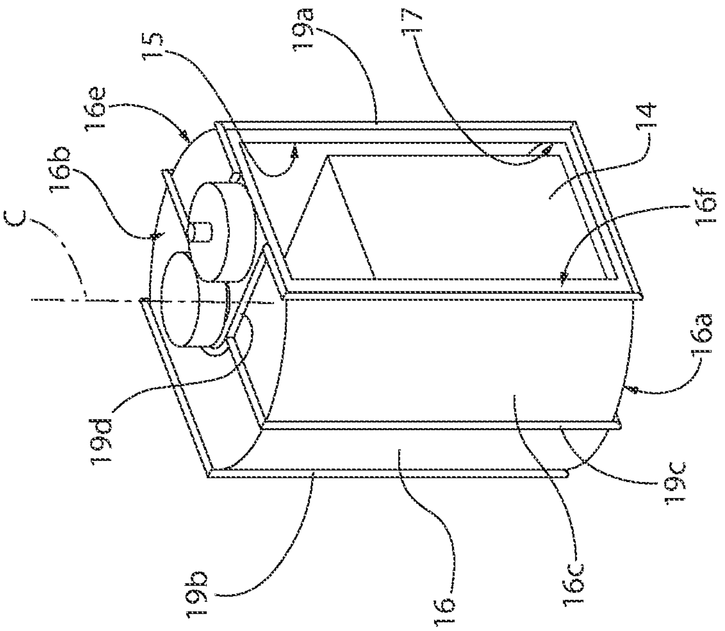

In the embodiment shown herein, the container 16 can rotate relative to the case 11 between the first and the second position around a rotational axis C, which is parallel or substantially parallel to the direction Z (FIGS. 6, 7 and 8). In detail, the rotation of the container 16 corresponds to a variation in the position of the opening 17 relative to the inner volume 12*b*.

More in detail, the case 11 comprises an opening 18, at which it is operatively coupled to the container 16. In the absence of the container 16, the opening 18 would establish a direct fluid communication between the inner volume 12*b* and outside atmospheric air.

The battery assembly 10 further comprises seals 19*a*, 19*b*, 19*c*, 19*d* interposed between the opening 18 and the container 16 (FIG. 8). The seals 19*a*, 19*b*, 19*c*, 19*d* are adapted to prevent outside air from flowing into the inner volume 12*b* in an undesired manner. In particular, the seals 19*a*, 19*b*, 19*c*, 19*d* are adapted to avoid the undesired inflow of outside air both when the exchange volume 15 is in the first or in the second position and during the movement of the exchange volume 15 between the first and the second position.

As shown in FIGS. 6 and 7, the container 16 has a prismatic shape and comprises: a base wall 16*a*, which is flat and orthogonal to the axis C; a flat wall 16*b*, which is parallel to the wall 16*a* and opposite the latter along the axis C; and a plurality of side walls 16*c*, 16*d*, 16*e* and 16*f* interposed between the wall 16*a* and the wall 16*b* along the axis C.

In detail, the side walls 16*c* and 16*e* are curved; the walls 16*d* and 16*f* are flat and perpendicular to the walls 16*a* and 16*b*. More in detail, moving around the axis C in a clockwise direction, the walls 16*c*, 16*d*, 16*e* and 16*f* are arranged in succession (FIGS. 6 and 7).

The container 16 comprises the opening 17 at the wall 16*f*. The opening 17 preferably has a rectangular shape and has dimensions that are larger than or equal to the dimensions of the dehydrating device 14 (FIG. 6).

The opening 18 has a shape corresponding to the outer shape of the container 16 (FIG. 8). In detail, the case 11 comprises a wall 18*a* and a wall 18*b*, both extending starting from the lid 36 towards the inner volume 12*b* and defining the opening 18. More in detail, the walls 18*a* and 18*b* face the walls 16*a* and 16*e* of the container 16, respectively, and are shaped so as to allow the container 16 to rotate relative to the case 11 around the axis C (the shape of the walls 18*a* and 18*b* in FIG. 8 is a mere example).

In the embodiment shown herein, the seals 19*a*, 19*b*, 19*c*, 19*d* are threadlike and are fixed to the outer surface of the container 16. In detail, the seal 19*a* is arranged at the wall 16*f*; the seal 19*b* is arranged at the wall 16*d* and the seals 19*c* and 19*d* are arranged in an intermediate position between the wall 16*d* and the wall 16*f*.

More in detail, the seal 19*a* extends at the edge between the wall 16*f* and the walls 16*a*, 16*c*, 16*e* adjacent thereto; the seal 19*b* extends at the edge between the wall 16*d* and the walls 16*a*, 16*c*, 16*e* adjacent thereto; the seal 19*c* extends along the walls 16*c* and 16*e* parallel to the axis C and along the wall 16*b* perpendicularly to the axis C; the seal 19*d* extends along the wall 16*b* and joins the seal 19*a* to the seal 19*c*. The seals 19*a*, 19*c* and 19*d* preferably form one single body.

The operation of the battery assembly 10 will be described hereinafter starting from a condition in which the exchange volume 15 is in the first position.

In use, the battery assembly 10 stores electrical energy and powers the electric motors 5. During its operation, the temperature of the batteries is limited by the cooling system 50.

Since the exchange volume 15 is in the first position, the exchange volume 15 is fluidly connected to the inner volume 12*b* and fluidly isolated from outside atmospheric air. As a consequence, the dehydrating device 14 absorbs the humidity of the air contained in the inner volume 12*b* due to the difference in concentration of humidity between the inner volume 12*b* and the dehydrating device 14. In this condition, the wall 16*d* faces the opening 18 (FIG. 5).

During the maintenance and replacement operations to which the dehydrating device 14 is subjected, the container 16 is rotated about the axis C, until the exchange volume 15 reaches the second position (FIGS. 4 and 8). In this position, the exchange volume 15 is fluidly isolated from the inner volume 12*b* and the dehydrating device 14 is accessible through the opening 18.

In detail, during the rotation between the first and the second position, the seals 19*a*, 19*b*, 19*c*, 19*d* prevent outside atmospheric air from flowing into the inner volume 12*b* in an undesired manner.

Owing to the above, the advantages of the battery assembly 10 and of the motor vehicle 1 according to the invention are evident.

Since the battery assembly 10 comprises the dehydrating device 14, which is selectively fluidly connected to the inner volume 12*b*, the level of humidity in the inner volume 12*b* can be limited in a simple and economic fashion. As a consequence, the risk of short circuits due to the formation of condensate in the inner volume 12*b* can be reduced.

Since the exchange volume 15 can selectively be shifted to the first or to the second position, the dehydrating device 14 can be replaced during maintenance operations without allowing outside air to flow into the inner volume 12*b*. As a matter of fact, the exchange volume 15 can be fluidly connected to the sole outside air or to the sole inner volume 12*b* and cannot be fluidly connected to the outside air and to the inner volume 12*b* at the same time. As a consequence, the exchange volume 15 acts as compensation chamber.

Because of the fact that the dehydrating device 14 is of the passive kind, the level of humidity in the inner volume 12*a*, 12*b* can be limited without having to use external energy.

Since the exchange volume 15 is movable relative to the case 11 with a rotation movement about the axis C, the shift between the first and the second position can be carried out by hand in a user-friendly and efficient manner.

Since the battery assembly 10 comprises the seals 19*a*, 19*b*, 19*c*, 19*d*, it is possible to ensure that outside air does not reach, in an undesired manner, the inner volume 12*a*, 12*b*, for example during the rotation of the exchange volume 15. The inflow of outside air, indeed, would make the dehydrating device 14 ineffective.

Finally, the battery assembly 10 and the motor vehicle 1 according to the invention can be subjected to changes and variants, which, though, do not go beyond the scope of protection set forth in the appended claims.

In particular, the battery assembly 10 could comprise more than one dehydrating device 14. For instance, the battery assembly 10 could comprise more than one dehydrating device 14 at the front group 10*a* and/or more than one dehydrating device 14 at the rear group 10*b*.

What is claimed is:

1. A battery assembly for a motor vehicle, comprising:

a case defining an inner volume; said inner volume being fluidly isolated from outside atmospheric air;

a plurality of batteries arranged within said inner volume;

at least one passive dehydrating device;

an exchange volume housing said dehydrating device, wherein said exchange volume is selectively positionable relative to said case in:

a first position, wherein said exchange volume is fluidly connected to said inner volume and fluidly isolated from outside atmospheric air; or a second position, wherein said exchange volume is fluidly isolated from said inner volume and fluidly connected to outside atmospheric air; and a container defining said exchange volume and comprising at least one opening, said opening facing said inner volume when said exchange volume is, in use, in said first position, and said opening being fluidly isolated from said inner volume and accessible from the outside of said battery assembly when said exchange volume is, in use, in said second position, wherein said container is rotatable relative to said case about a rotational axis.

2. The battery assembly according to claim 1, wherein said dehydrating device comprises a hygroscopic salt cartridge.

3. The battery assembly according to claim 1, wherein said opening is conformed to allow, in use, said dehydrating device to be inserted and removed from said container, when said exchange volume is, in use, in said second position.

4. The battery assembly according to claim 1, wherein said case comprises a further opening; said container being operatively coupled to said case at said further opening; and said battery assembly further comprising a seal interposed between said further opening and said container.

5. The battery assembly according to claim 4, wherein said container has a prismatic shape and said further opening has a shape corresponding to said container.

6. The battery assembly according to claim 1, wherein the battery assembly further comprises one or more power electronic devices.

7. A motor vehicle, comprising:

a frame;

a plurality of wheels rotatable about respective rotational axes relative to said frame;

one or more electric motors operatively connected to said wheels and adapted to drive said wheels in rotation about said rotational axes; and a battery assembly according to claim 1, said plurality of batteries of said battery assembly being electrically connected to said electrical motors.

8. The motor vehicle according to claim 7, comprising a cooling system adapted to limit the temperature of said batteries.

* * * * *